United States Patent [19]

Taga et al.

[11] Patent Number: 5,008,149
[45] Date of Patent: Apr. 16, 1991

[54] CERAMIC SUBSTRATE HAVING A METALLIC LAYER THEREON AND A PROCESS FOR MANUFACTURING THE SAME

[75] Inventors: Yasunori Taga; Hideya Yamadera, both of Nagoya; Keiji Aoki, Susono; Tadashi Hattori, Okazaki, all of Japan

[73] Assignees: Kabushiki Kaisha Toyota Chuo Kenkyusho, Aichi; Nippon Soken Inc., Nishio, both of Japan

[21] Appl. No.: 274,481

[22] Filed: Nov. 22, 1988

[30] Foreign Application Priority Data

Nov. 24, 1987 [JP] Japan .................. 62-295823

[51] Int. Cl.$^5$ .................. B32B 15/04; B32B 15/20
[52] U.S. Cl. .................. 428/336; 428/457; 428/469; 428/472.2
[58] Field of Search ............ 428/469, 457, 336, 472.2; 75/252

[56] References Cited

U.S. PATENT DOCUMENTS

| | | | |
|---|---|---|---|
| 4,532,179 | 7/1985 | Takami et al. | 428/469 X |
| 4,556,389 | 12/1985 | Ueno et al. | 428/469 X |
| 4,822,645 | 4/1989 | Oda et al. | 75/252 X |

Primary Examiner—Thomas J. Herbert
Attorney, Agent, or Firm—Oblon, Spivak, McClelland, Maier & Neustadt

[57] ABSTRACT

A ceramic substrate and a metallic layer formed thereon are bonded closely by means of a bonding layer formed between the ceramic substrate and the metallic layer. The ceramic substrate comprises either alumina or a ceramic containing alumina, and the metallic layer comprises either molybdenum (Mo) or an alloy composed of molybdenum (Mo) and at least one of titanium (Ti), zirconium (Zr) and niobium (Nb). The bonding layer comprises composite oxides of aluminum and at least one of titanium (Ti), zirconium (Zr) and niobium (Nb) and formed by either a process of (1) forming an intermediate layer comprising at least one of titanium (Ti), zirconium (Zr) and niobium (Nb) between the ceramic substrate and the metallic layer, and subjecting the laminated substance to a heat treatment to a cause a reaction between alumina and the intermediate layer; or (2) forming an alloy layer comprising an alloy of molybdenum (Mo) and at least one of titanium (Ti), zirconium (Zr) and niobium (Nb) directly on the ceramic substrate, and subjecting the laminated substance to a heat treatment to cause a reaction between alumina and at least one of titanium (Ti), zirconium (Zr) and niobium (Nb) contained in the alloy layer.

5 Claims, No Drawings

CERAMIC SUBSTRATE HAVING A METALLIC LAYER THEREON AND A PROCESS FOR MANUFACTURING THE SAME

BACKGROUND OF THE INVENTION

1. Field of the Invention

The present invention relates to a ceramic substrate having a metallic layer thereon and a process for manufacturing the same, in which an improved bonding between ceramic substrate containing alumina and a metallic layer of molybdenum and the like is facilitated without requiring a high-temperature heat treatment.

2. Discussion of the Background

Conventionally, Telefunken process has been widely used to facilitate relatively close bonding between ceramic materials and metals.

In the Telefunken process, first, the surface of a ceramic material such as alumina and the like is coated with a paste prepared by mixing molybdenum (Mo) and manganese (Mn) powders with an organic binder. Then, the coated ceramic material is subjected to a heat treatment at the temperature of 1300° to 1700° C. in moisturized forming gas or moisturized hydrogen.

However, since the high-temperature heat treatment is essential for the Telefunken process to obtain a sufficient bonding between the ceramic material and the metallic layer, the adverse effect of the high-temperature on materials adjacent to the ceramic material is unavoidable. Further, many other inconveniences such as low density and high porosity of the bonding layer are also associated with the Telefunken process.

SUMMARY OF THE INVENTION

Accordingly, it is an object of this invention to overcome the problems mentioned above.

It is another object of the present invention to provide a ceramic substrate having a metallic layer thereon and a process for manufacturing the same, in which the ceramic substrate and the metallic layer are closely bonded together without performing a high-temperature heat treatment.

The above objects can be accomplished according to the present invention based on the following concepts:

(1) The bonding strength between alumina material and molybdenum layer thereon depends on the strength of the molybdenum layer. In this respect, a disadvantage lies in the Telefunken process, that is, since Telefunken process uses powdered molybdenum, the thickness of a layer bonding alumina substrate and molybdenum layer is generally in the range of 10 to 20 $\mu$m, and has a porous structure.

Accordingly, the present invention has been developed to eliminate the above disadvantages by forming a thinner molybdenum layer with a dense structure.

(2) The bonding between the alumina substrate and the molybdenum layer, depends on the reactivity at the interface between the alumina substrate and the molybdenum layer. Conventionally, in order to develop enough reactivity a high-temperature heat treatment has been required.

In this respect, the present inventors developed a novel process of adding supplementary elements which have a higher reactivity to alumina than the reactivity of molybdenum to alumina, and which are capable of forming ternary composite oxides with alumina to facilitate the reaction at a low temperature.

DETAILED DESCRIPTION OF THE INVENTION

A ceramic substrate having a metallic layer thereon according to the present invention comprises a ceramic substrate comprising either alumina or a ceramic containing alumina, and a metallic layer containing at least molybdenum formed on the ceramic substrate, in which the ceramic substrate and the metallic layer are bonded together by means of a bonding layer comprising composite oxides composed of aluminum and at least one metal selected from the group of titanium (Ti), zirconium (Zr) and niobium (Nb).

The ceramic substrate may be made either of alumina or mixtures of alumina and other ceramic materials, such as silicon nitride and the like, as required.

The metallic layer contains at least molybdenum. An alloy of molybdenum and at least one of titanium, zirconium and niobium may be used for the metallic layer. The thickness of the metallic layer is preferably in the range of 0.1 to 20 $\mu$m. This is because if the metallic layer of less than 0.1 $\mu$m-thickness is formed, the resulting metallic layer will not have uniform thickness, and the resulting layer will be discontinuous. Consequently, in the subsequent brazing process, a brazing material will react with the bonding layer directly, and the brazing will deteriorate the bonding between the ceramic substrate and the metallic layer. On the contrary, if the metallic layer is formed in a thickness of more than 20 $\mu$m-thickness, the metallic layer will come off due to the internal stress and the like.

The most important feature of the present invention is to provide a bonding layer between the ceramic substrate and the metallic layer. The bonding layer is made of composite oxides formed of aluminum and at least one of titanium, zirconium and niobium. The thickness of the bonding layer is preferably in the range of 0.005 to 0.5 $\mu$m. This is because if the bonding layer is formed in a thickness of less than 0.005 $\mu$m-thickness, the resulting bonding layer will not have uniform thickness, and therefore, drawbacks such as pinholes will occur. On the contrary, if the bonding layer is formed in a thickness of more than 0.5 $\mu$m-thickness, the bonding layer itself will possibly come off due to the internal stress and the like.

A process for manufacturing the above-described ceramic substrate having a metallic layer comprises the following steps of:

(1) forming an intermediate layer comprising at least one metal selected from the group of titanium, zirconium and niobium on the surface of a ceramic substrate comprising either alumina or a ceramic containing alumina;

(2) forming a metallic layer comprising either molybdenum, or an alloy of molybdenum and at least one metal selected from the group of titanium, zirconium and niobium on the intermediate layer;

(3) subjecting a laminated substance resulting from (1) and (2) to a heat treatment to cause a reaction between alumina and the intermediate layer so that a bonding layer comprising composite oxides containing aluminum is formed between the ceramic substrate and the metallic layer.

In the above said first step, the film-shaped intermediate layer comprising at least one of titanium, zirconium and niobium is formed on the ceramic substrate containing alumina. The film-shaped intermediate layer may be formed by the well-known conventional methods which include physical means such as vacuum deposition, sputtering and ion-plating, and chemical means such as wet-plating, plasma CVD, Alkoxide process and the like.

In the second step, the metallic layer comprising molybdenum or an alloy comprising molybdenum and at least one of titanium, zirconium and niobium is formed on the intermediate layer. The metallic layer may be formed by the same conventional physical means (PVD) or the chemical means (CVD) which are used to form the intermediate layer.

In the third step, a heat treatment is given to the laminated substance resulting from the previous steps to cause a reaction between alumina and the intermediate layer so that composite oxides containing aluminum, namely, Al—X—O: X represents titanium(Ti), zirconium(Zr) or niobium(Nb), are formed as a bonding layer between the ceramic substrate and the metallic layer. A heat treatment at temperatures of 800° C. or more will be appropriate for facilitating the sufficient bonding.

As an alternative to the above-mentioned manufacturing steps, the following modification may be used, which comprises the steps of:

(1) forming an alloy layer from an alloy comprising molybdenum and at least one of titanium, zirconium and niobium directly on a ceramic substrate comprising either alumina or a ceramic containing alumina, (2) subjecting the resulting laminated substance to a heat treatment to cause a reaction between alumina and at least one of titanium, zirconium and niobium contained in the alloy layer so that composite oxides containing aluminum is formed as a bonding layer between the ceramic substrate and the metallic layer.

In the first step, the alloy layer comprising molybdenum and at least one of titanium, zirconium and niobium may be formed on the ceramic substrate by the conventional methods mentioned in the manufacturing step previously described.

In the second step, a heat treatment is given to the laminated substance resulting from the first step to cause a reaction between alumina in the ceramic substrate and at least one of titanium, zirconium and niobium contained in the alloy layer so that composite oxides containing aluminum, namely, Al—X—O: X represents titanium (Ti), zirconium(Zr) or niobium(Nb), are formed as a bonding layer between the ceramic substrate and the metallic layer.

A heat treatment at temperatures of 800° C. or more will be appropriate for facilitating the sufficient bonding.

According to the present invention, the ceramic substrate and the metallic layer are closely bonded by means of the bonding layer made of the composite oxides containing aluminum and at least one of titanium, zirconium and niobium.

The bonding layer comprising the composite oxides in accordance with the present invention can be produced either by the steps of forming the film-shaped layer comprising at least one of titanium, zirconium and niobium as an intermediate layer between the ceramic substrate and the metallic layer, and subjecting the laminated substance to a heat treatment to cause a reaction between alumina in the ceramic substrate and the intermediate layer; or by the alternative steps of forming an alloy layer from an alloy comprising molybdenum and at least one of titanium, zirconium and niobium directly on the ceramic substrate, and subjecting the laminated substance to a heat treatment to cause a reaction between alumina in the ceramic substrate and at least one of titanium, zirconium and niobium in the alloy layer.

The advantages of the invention are illustrated by the following EXAMPLES, it should be understood that numerous variations are apparent to those skilled in the art.

EXAMPLE 1

In this Example, a ceramic substrate made of alumina, and an alloy layer made of molybdenum and titanium were used.

The alumina substrate was subjected to a surface grinding, washing and drying, and then placed in a sputtering chamber. From the sputtering chamber, the air was vacuumed to $5 \times 10^{-6}$ Torr and argon gas was introduced to increase the pressure in the chamber to $5 \times 10^{-3}$ Torr. A high frequency of 13.56 MHz was applied to the alumina substrate to generate plasma, thereby performing sputter-etching on the alumina substrate at an input electric power of 100 watt. Then, while maintaining the vacuum state in the sputtering chamber, DC voltage was applied to each of molybdenum and titanium targets to generate plasma, thereby inputting an electric power of 100 watt to molybdenum target and an electric power of 60 watt to titanium target respectively. Accordingly an alloy layer comprising molybdenum and titanium was formed on the alumina substrate. Then the laminated substance was taken out of the sputtering and was subjected to a heat treatment at 800° C. for 1 hour. Thus, a ceramic substrate having a metallic layer according to this invention was produced.

The resulting ceramic substrate was analyzed by Auger electron spectroscopy in the depth directron. As a result of the analysis, the following were found:

1. A 0.06 μm-thickness bonding layer comprising oxides composed of Al-Ti-O was formed between the ceramic substrate and the metallic layer.

2. A 0.7 μm-thickness alloy layer comprising Mo-Ti alloy was formed.

3. The alumina substrate and the alloy layer comprising Mo-Ti alloy were bonded together by the bonding layer.

Next, a tensile test was conducted by the following manner in order to evaluate the bonding strength between the alumina substrate and the alloy layer.

On the surface of the alloy layer, a $\phi 3$ mm kovar bar was brazed with silver wax at 800° C. and tensile force was applied thereto. The obtained tensile strength was 12.5 kg/mm². This value was far better than those obtained from comparative Examples which will be described later.

The results of the evaluation are shown in Table.

EXAMPLE 2

A ceramic substrate made of alumina was prepared and subjected to the same surface treatment given in Example 1. On the surface of the ceramic substrate, a titanium film was formed by the sputtering. Then, while maintaining the vacuum state in the sputtering chamber, a subsequent molybdenum film was also formed on the titanium film by the sputtering. The laminated substance thus obtained comprised the alumina substrate, the titanium film and the molybdenum film. The laminated substance was taken out of the sputtering chamber and subjected to a heat treatment at a temperature of 800° C. for 1 hour. Thus, a ceramic substrate having a metallic layer according to this invention was produced.

The resulting ceramic substrate was analyzed by the Auger electron spectroscopy in the depth direction. As a result of the analysis, the followings were found:

1. A 0.06 μm-thickness bonding layer comprising oxides composed of Al-Ti-O was formed.
2. A 0.7 μm-thickness metallic layer comprising molybdenum was formed.
3. The interface between the ceramic substrate and the bonding layer, and the interface between the bonding layer and the metallic layer were formed continuously by an interdiffusion reaction, thereby forming a jointed substance comprising the alumina substrate and the molybdenum layer.

The ceramic substrate was then evaluated by the same tensile test given in the Example 1. The ceramic substrate exhibited a tensile strength of 10.0 kg/mm$^2$, and this value was also far better than those obtained from the Comparative Examples.

EXAMPLES 3 to 14

As shown in Table, the various compositions for the ceramic substrate and the metallic layer were used to manufacture the ceramic substrates having the metallic layer according to this invention, and subjected to the heat treatment performed at different temperatures. The resulting Examples were evaluated by the Auger electron spectroscopy and the tensile test by the same manner described for the previous Examples 1 and 2. The results of the evaluation are also shown in Table.

COMPARATIVE EXAMPLE 1

A ceramic substrate comprising alumina was used. A 10 μm-thickness molybdenum layer was formed on the alumina substrate by sputtering. The laminated substance was subjected to a heat treatment at 800° C. for 1 hour to obtain a joined substrate. The resulting joined substance was evaluated by the Auger electron spectroscopy and by the tensile test in the same manner described for the previous Examples. It was found that a 0.5 μm-thickness bonding layer comprising oxides composed of Mo-Al-O was formed, and the tensile strength was 5 kg/mm$^2$.

COMPARATIVE EXAMPLE 2

A ceramic substrate comprising alumina and 40 mol % silicon nitride was used. other than the material for the ceramic substrate, the same materials and manufacturing conditions employed for the Comparative Example 1 were employed. The resulting joined substance was then subjected to the same evaluation conducted to the previous Examples. According to the evaluation, the tensile strength was 4 kg/m$^2$.

As shown in Table, the ceramic substrate having a metallic layer thereon according to the present invention is provided with the bonding layer of the composite oxides comprising alumina and at least one of titanium, zirconium and niobium between the ceramic substrate and the metallic layer. The bonding layer may be formed in a form of the composite oxides by the reaction between the alumina contained in the ceramic substrate and titanium, zirconium and niobium or a mixture thereof which has been provided as the intermediate layer in advance between the ceramic substrate and the metallic layer. Or the bonding layer may be formed in the form of the composite oxides by the reaction between the alumina and titanium, zirconium and niobium or a mixture thereof which has been contained in the alloy layer and moved to the interface adjacent to the ceramic substrate by diffusion during the heat treatment process. Thus, titanium, zirconium and niobium have a high reactivity to oxygen and reacts with alumina to form the composite oxides at low temperatures of about 800° C.

According to the Auger electron spectroscopy in the depth direction of the Examples, it was found that the interfaces between the ceramic substrate and the bonding layer, and between the bonding layer and the metallic layer were continuously formed. Accordingly, it is apparent that the joined substances on the ceramic substrates having the metallic layer of the Examples have been joined by an excellent bonding force even though they have been treated at low temperatures. Consequently, the ceramic substrate having the metallic film layer can be manufactured by a simple manufacturing process at low temperatures without adversely affecting materials adjacent to the ceramic substrates. The resulting ceramic substrate is highly reliable so that it can be employed by various mechanical parts.

Obviously, numerous modifications and variations of the present invention are possible in light of the above teachings. It is therefore to be understood that within

TABLE

| Example No. | Metallic layer Composition | Thickness (μm) | Bonding layer Composition | Thickness (μm) | Ceramic Substrate Material | Heat Treatment Temperature (°C.) | Tensile Strength (kg/mm$^2$) | Evaluation |
|---|---|---|---|---|---|---|---|---|
| 1 | Mo-Ti | 0.7 | Al-Ti-O | 0.06 | Al$_2$O$_3$ | 800 | 12.5 | Excellent |
| 2 | Mo | 0.7 | Al-Ti-O | 0.06 | ↑ | 800 | 10.0 | Excellent |
| 3 | Mo-Ti | 0.1 | Al-Ti-O | 0.005 | ↑ | 800 | 13.1 | Excellent |
| 4 | Mo-Ti | 20.0 | Al-Ti-O | 0.5 | ↑ | 800 | 10.5 | Excellent |
| 5 | Mo-Nb | 0.6 | Al-Nb-O | 0.02 | ↑ | 900 | 12.0 | Excellent |
| 6 | Mo-Zr | 0.8 | Al-Zr-O | 0.02 | ↑ | 1000 | 9.7 | Good |
| 7 | Mo-Ti-Nb | 1.0 | Al-Ti-Nb-O | 0.04 | ↑ | 800 | 9.3 | Good |
| 8 | Mo-Ti | 0.7 | Al-Ti-O | 0.04 | Al$_2$O$_3$ & 40 mol % Si$_3$N$_4$ | 800 | 10.3 | Excellent |
| 9 | Mo | 0.7 | Al-Ti-O | 0.04 | ↑ | 800 | 9.5 | Good |
| 10 | Mo-Ti | 0.1 | Al-Ti-O | 0.005 | ↑ | 800 | 11.0 | Excellent |
| 11 | Mo-Ti | 20.0 | Al-Ti-O | 0.5 | ↑ | 800 | 9.8 | Good |
| 12 | Mo-Nb | 0.6 | Al-Nb-O | 0.02 | ↑ | 900 | 10.0 | Excellent |
| 13 | Mo-Zr | 0.8 | Al-Zr-O | 0.02 | ↑ | 1000 | 8.3 | Good |
| 14 | Mo-Ti-Nb | 1.0 | Al-Ti-Nb-O | 0.04 | ↑ | 800 | 8.5 | Good |
| Comparative Example 1 | Mo | 10.5 | Al-Mo-O | 0.5 | Al$_2$O$_3$ | 800 | 5 | |
| Comparative Example 2 | Mo | 10.5 | Al-Mo-O | 0.5 | Al$_2$O$_3$ & 40 mol % Si$_3$N$_4$ | 800 | 4 | |

We claim:

1. A ceramic substrate having a metallic layer thereon comprising:
   a ceramic substrate comprising alumina;
   a metallic layer containing at least molybdenum (Mo), and formed on said ceramic substrate; and
   a bonding layer comprising composite oxides composed of aluminum (Al) and at least one metal selected from the group consisting of titanium (Ti), zirconium (Zr) and niobium (Nb), and formed between said ceramic substrate and said metallic layer by chemical reaction between said alumina of said ceramic substrate and said bonding layer; in which said ceramic substrate and said metallic layer is bonded by means of said bonding layer.

2. The ceramic substrate having a metallic layer thereon according to claim 1, wherein said metallic layer comprises an alloy of molybdenum (Mo) and at least one metal selected from the group consisting of titanium (Ti), zirconium (Zr) and niobium (Nb).

3. The ceramic substrate having a metallic layer thereon according to claim 1, wherein the thickness of said bonding layer is in the range of 0.005 to 0.5 μm.

4. The ceramic substrate having a metallic layer thereon according to claim 1, wherein the thickness of said metallic layer is in the range of 0.1 to 20 μm.

5. The ceramic substrate having a metallic layer according to claim 1, wherein said bonding layer comprises Al-X-O wherein X is at least one metal of Ti, Zr or Nb.

* * * * *